United States Patent
Kobata

(10) Patent No.: US 10,393,186 B2
(45) Date of Patent: Aug. 27, 2019

(54) CONSTANT VELOCITY JOINT

(71) Applicant: JTEKT CORPORATION, Osaka-shi (JP)

(72) Inventor: Keishi Kobata, Anjo (JP)

(73) Assignee: JTEKT CORPORATION, Osaka-shi (JP)

( * ) Notice: Subject to any disclaimer, the term of this patent is extended or adjusted under 35 U.S.C. 154(b) by 274 days.

(21) Appl. No.: 15/434,962

(22) Filed: Feb. 16, 2017

(65) Prior Publication Data

US 2017/0241481 A1  Aug. 24, 2017

(30) Foreign Application Priority Data

Feb. 24, 2016 (JP) .................................. 2016-033116

(51) Int. Cl.

| | |
|---|---|
| *F16D 3/205* | (2006.01) |
| *F16C 1/00* | (2006.01) |
| *F16C 33/34* | (2006.01) |
| *F16C 33/58* | (2006.01) |
| *F16D 3/202* | (2006.01) |

(52) U.S. Cl.
CPC .............. *F16D 3/2055* (2013.01); *F16C 1/00* (2013.01); *F16C 33/34* (2013.01); *F16C 33/585* (2013.01); *F16C 2361/41* (2013.01); *F16D 2003/2026* (2013.01); *Y10S 464/905* (2013.01)

(58) Field of Classification Search
CPC ... F16C 1/00; F16D 3/2055; F16D 2003/2026
USPC .................. 464/111, 123, 124, 132; 384/564
See application file for complete search history.

(56) References Cited

U.S. PATENT DOCUMENTS

| 7,371,179 B2* | 5/2008 | Kawakatsu | ........... F16C 33/605 464/111 |
|---|---|---|---|
| 7,682,254 B2* | 3/2010 | Araki | ...................... F16D 3/385 464/132 |

FOREIGN PATENT DOCUMENTS

JP   2012-197832   10/2012

* cited by examiner

*Primary Examiner* — Greg Binda
(74) *Attorney, Agent, or Firm* — Oblon, McClelland, Maier & Neustadt, L.L.P.

(57) ABSTRACT

A constant velocity joint includes: an outer joint member having a raceway groove; an inner joint member having a leg shaft; a roller that is able to roll on the raceway groove; and a needle bearing that supports an inner periphery of the roller such that the inner periphery of the roller is able to rotate with respect to the leg shaft. The leg shaft includes: a roll portion that supports the needle bearing; a contact portion that is able to contact an end face of the needle bearing, the end face facing a first side in the direction of a central axis of the needle bearing; and a recess portion formed between the roll portion and the contact portion, in a position where the recess portion is recessed from a space in which the needle bearing is disposed.

6 Claims, 2 Drawing Sheets

CONSTANT VELOCITY JOINT

INCORPORATION BY REFERENCE

The disclosure of Japanese Patent Application No. 2016-033116 filed on Feb. 24, 2016 including the specification, drawings and abstract, is incorporated herein by reference in its entirety.

BACKGROUND OF THE INVENTION

1. Field of the Invention

The present invention relates to a constant velocity joint.

2. Description of the Related Art

A constant velocity joint is known to have an outer joint member having a plurality of raceway grooves extending in an axial direction, and an inner joint member having a plurality of leg shafts inserted in the raceway grooves. Japanese Patent Application Publication No. 2012-197832 (JP 2012-197832 A) discloses a tripod shaft (leg shaft) in which a recess groove is formed between a torque transmission surface having a circular cross section and a seat protruding outward in a radial direction with respect to the torque transmission surface. The recess groove is a portion formed to prevent interference with an end portion of a shaft-like rolling element, which rolls on the torque transmission surface. The recess groove is recessed inward in the radial direction with respect to the torque transmission surface, and has a concave surface.

A base portion of the tripod shaft is a portion on which stress concentrates, and thus needs high strength. In the technique described in JP 2012-197832 A, however, if a curvature radius of the recess groove is decreased, the stress concentrates on a portion in which the recess groove is formed, reducing the strength of the base portion of the tripod shaft. In contrast, if the curvature radius of the recess groove is increased, a connection position between the recess groove and the torque transmission surface is positioned closer to a leading end side of the tripod shaft. In this case, the axial length of the torque transmission surface is reduced, and thus a contact area between the torque transmission surface and the shaft-like rolling element is reduced. This causes wear of the torque transmission surface and the shaft-like rolling element, possibly deteriorating torque transmission efficiency.

SUMMARY OF THE INVENTION

An object of the present invention is to provide a constant velocity joint that can efficiently transmit torque while reducing the deterioration of strength.

A constant velocity joint of one aspect of the present invention includes:

an outer joint member that is open on its first side in an axial direction, and that has a raceway groove extending in the axial direction;

an inner joint member having a leg shaft extending in a radial direction;

a roller that is able to roll on the raceway groove of the outer joint member; and a needle bearing that supports an inner periphery of the roller such that the inner periphery of the roller is able to rotate with respect to the leg shaft of the inner joint member.

The leg shaft includes: a roll portion that supports the needle bearing such that the needle bearing is able to roll on the roll portion; a contact portion that is located outward in a radial direction of the leg shaft with respect to the roll portion, and that is able to contact an end face of the needle bearing, the end face facing a first side in the direction of a central axis of the needle bearing; and a recess portion formed between the roll portion and the contact portion, in a position where the recess portion is recessed from a space in which the needle bearing is disposed.

The recess portion includes a first concave portion formed in a position where the first concave portion is recessed toward a base side of the leg shaft with respect to the contact portion.

In the constant velocity joint of the aspect of the present invention, the recess portion includes the first concave portion, which is formed in a position where the first concave portion is recessed toward the base side of the leg shaft with respect to the contact portion. In this case, even when the curvature radius of the recess portion is increased, since the connection position between the roll portion and the recess portion can be positioned closer to the base side of the leg shaft, a sufficient axial length of the roll portion can be ensured. Thus, the torque can be efficiently transmitted between the outer joint member and the inner joint member, while the deterioration of the strength can be reduced.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Hereinafter, an embodiment to which a constant velocity joint of the present invention is applied will be described with reference to the accompanying drawings. First, a constant velocity joint 1 of one embodiment of the present invention will be schematically described with reference to FIG. 1.

Figure 1:
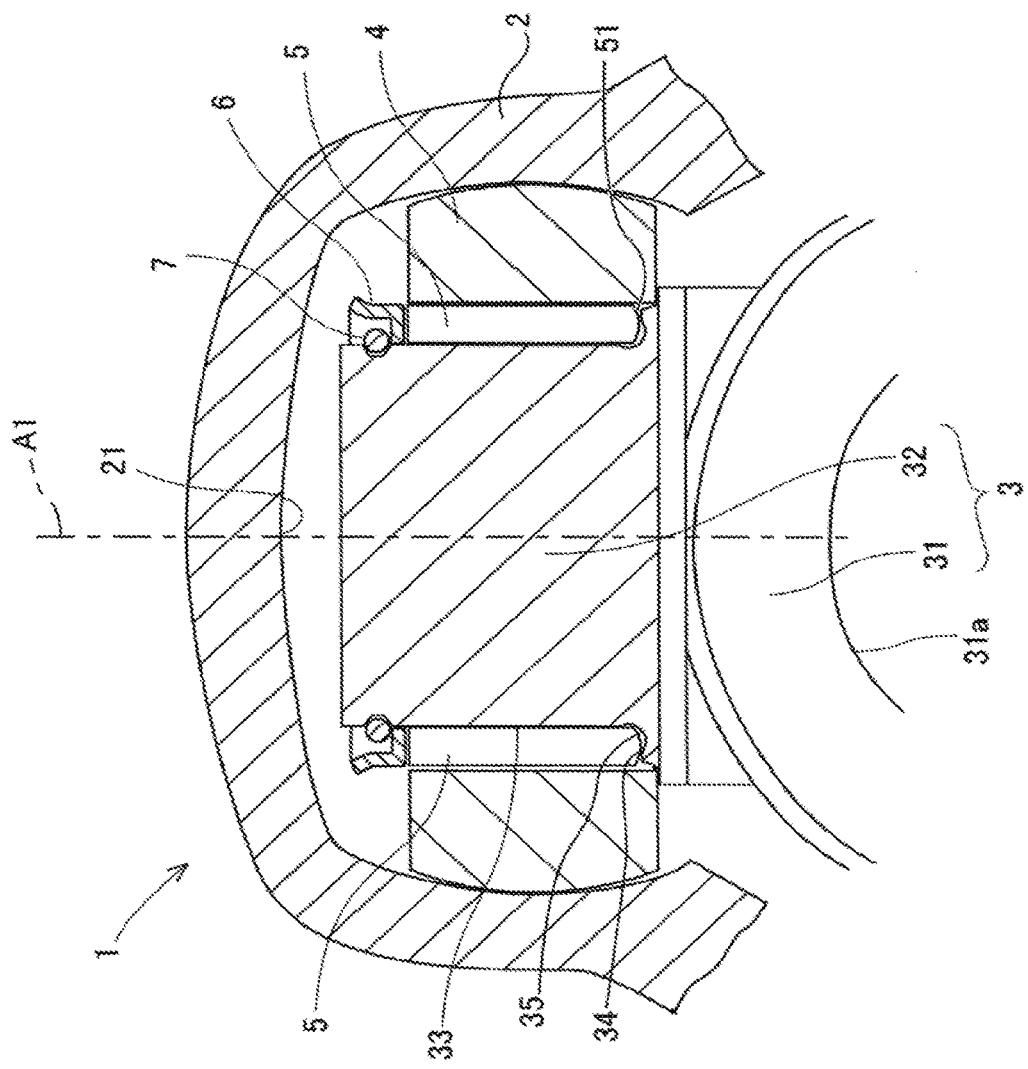
FIG. 1 is a partially enlarged sectional view of a constant velocity joint of one embodiment of the present invention, showing a section of the constant velocity joint perpendicular to a central axis of an outer joint member and an inner joint member.

As shown in FIG. 1, the constant velocity joint 1 is a tripod constant-velocity joint of a single roller type, and is used at, for example, a coupling portion between a differential gear of a vehicle and an intermediate shaft of a drive shaft. The constant velocity joint 1 mainly includes an outer joint member 2, an inner joint member 3, three rollers 4, a plurality of needle bearings (needle roller bearings) 5, three retainers 6, and three locating snap rings 7.

The outer joint member 2 is formed like a closed-end cylinder, and is provided, on an outer side of the bottom of the outer joint member 2, with a stem (not shown) that is connected to the differential gear (not shown). The outer joint member 2 is also provided, in its inner periphery, with three raceway grooves 21 extending in an axial direction of the outer joint member 2 and formed at regular intervals in a circumferential direction. In FIG. 1, only one of the three raceway grooves 21, formed in the outer joint member 2, is shown; and the other two raceway grooves 21 are omitted.

The inner joint member 3 is disposed inside the outer joint member 2. The inner joint member 3 includes a boss 31 and three leg shafts 32. The boss 31 is formed like a cylinder. An outer periphery of the boss 31 is formed like a spherical convex shape, and an inner periphery of the boss 31 is provided with a female spline 31a. This female spline 31a fits in a male spline (not shown) formed on an outer periphery of the intermediate shaft (not shown). In FIG. 1, only the leg shaft 32 of the inner joint member 3 is viewed in section; and the other components except the leg shaft 32 are shown such that forms of the other components are schematically shown.

The leg shafts 32 are column-like portions extending outward in a radial direction from the outer periphery of the boss 31. The three leg shafts 32 are disposed at regular intervals around a rotational axis of the inner joint member 3, and inserted in the respective raceway grooves 21.

The three rollers 4 are annular members that can roll on the raceway grooves 21, and accommodated in the respective raceway grooves 21. Each of the needle bearings 5 is a rolling element that supports an inner periphery of the roller 4 such that the inner periphery of the roller 4 can rotate with respect to the outer periphery of the leg shaft 32. The plurality of needle bearings 5 are disposed between the outer periphery of the leg shaft 32 and the inner periphery of the roller 4.

The retainer 6 is a cylindrical member, and is disposed on a leading end side (i.e. upper side in FIG. 1) of the leg shaft 32 with respect to the roller 4 and the plurality of needle bearings 5. The locating snap ring 7 is fitted on the leg shaft 32 on the leading end side of the leg shaft 32 with respect to the retainer 6. With this, the needle bearings 5 are restricted from being displaced to the leading end side of the leg shaft 32 exceeding a position of the retainer 6; and the retainer 6 is restricted from being displaced to the leading end side of the leg shaft 32 exceeding a position of the locating snap ring 7.

Figure 2A:
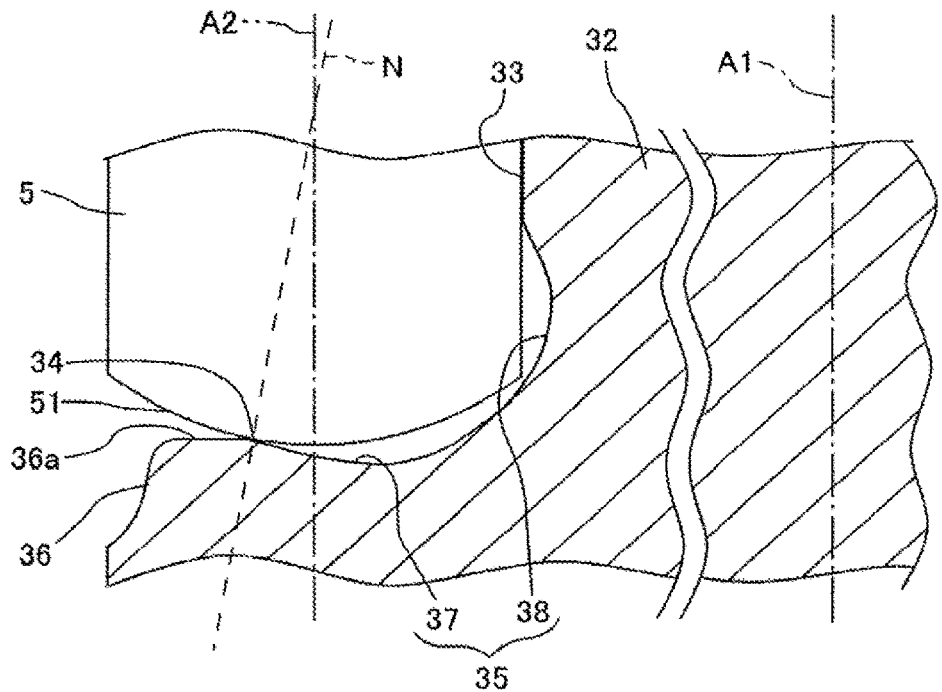
FIG. 2A is a partially enlarged sectional view of the constant velocity joint in which one portion of the constant velocity joint shown in FIG. 1 is enlarged.

Next, with reference to FIG. 2A, the configuration of the leg shaft 32 will be described. As shown in FIG. 2A, the leg shaft 32 includes a roll portion 33, a contact portion 34, a recess portion 35, and an outer periphery portion 36.

The roll portion 33 is a column-like portion that extends in the direction of a central axis A1 of the leg shaft 32, and supports the needle bearings 5 on the outer periphery of the roll portion 33 to enable the rolling movement. The contact portion 34 is a portion located on an outside in a radial direction of the leg shaft 32 with respect to the roll portion 33. A normal N of the contact portion 34 is inclined with respect to the central axis A1 of the leg shaft 32, and crosses the central axis A1 of the leg shaft 32 on the leading end side (i.e. upper side in FIG. 2A) of the leg shaft 32 with respect to the contact portion 34.

The recess portion 35 is a portion formed between the roll portion 33 and the contact portion 34 and includes a first concave portion 37 and a second concave portion 38. The first concave portion 37 is a concave portion extending inward in the radial direction of the leg shaft 32 from the contact portion 34, and is located on a base side (i.e. lower side in FIG. 2A) of the leg shaft 32 with respect to the contact portion 34. The second concave portion 38 is a concave portion formed between the roll portion 33 and the first concave portion 37, and is located on an inner side in the radial direction of the leg shaft 32 with respect to the outer periphery of the roll portion 33, on which the needle bearings 5 roll.

The curvature radius of the recess portion 35 may be constant as a whole, or otherwise may be varied as necessary depending on a portion of the recess portion 35. For example, the curvature radius of the first concave portion 37 may be different from the curvature radius of the second concave portion 38. In the second concave portion 38, the curvature radius on a leading end side in the direction of the central axis A1 of the leg shaft 32 may be different from the curvature radius on a base side in the direction of the central axis A1 of the leg shaft 32.

The outer periphery portion 36 is a portion extending outward in the radial direction from the contact portion 34. The outer periphery portion 36 is provided with a flat portion 36a that is parallel to a plane perpendicular to the central axis A1 of the leg shaft 32. The flat portion 36a is utilized, as a reference, to control the positions of the retainer 6 and the locating snap ring 7.

Next, a relationship between the leg shaft 32 and the needle bearing 5 will be described in comparison with a relationship between a conventional leg shaft 532 and the needle bearing 5.

Here, the needle bearing 5 is provided with a reduced diameter portion 51 formed on an end face of the needle bearing 5 facing a first side (i.e. lower side in FIG. 2A) in the direction of a central axis A2. The reduced diameter portion 51 has a diameter reduced toward the first side in the direction of the central axis A2 of the needle bearing. In the present embodiment, the end face of the needle bearing 5 facing the first side in the direction of the central axis A2 of the needle bearing 5 is formed like a surface of a sphere. But the present invention is not limited to this. For example, the end face of the needle bearing 5 facing the first side in the direction of the central axis A2 of the needle bearing 5 may be formed like a truncated hemisphere or a truncated cone.

The plurality of needle bearings 5 are disposed such that the needle bearings 5 can roll on the outer periphery of the roll portion 33. The reduced diameter portion 51 of each of the needle bearings 5 contacts the contact portion 34 at a position distant (further) from the central axis A1 of the leg shaft 32 than the central axis A2 of the needle bearing 5. The recess portion 35 is formed at a position where the recess portion 35 is recessed from a space in which the needle bearing 5 is disposed, thus preventing contact with the needle bearing 5. With these, it is possible to reduce a contact area between the leg shaft 32 and the end face of the needle bearing 5 facing the first side in the direction of the central axis A2, and thus is possible to smoothly roll the needle bearing 5. As a result of this, the torque can be efficiently transmitted between the outer joint member 2 (see FIG. 1) and the inner joint member 3.

Figure 2B:
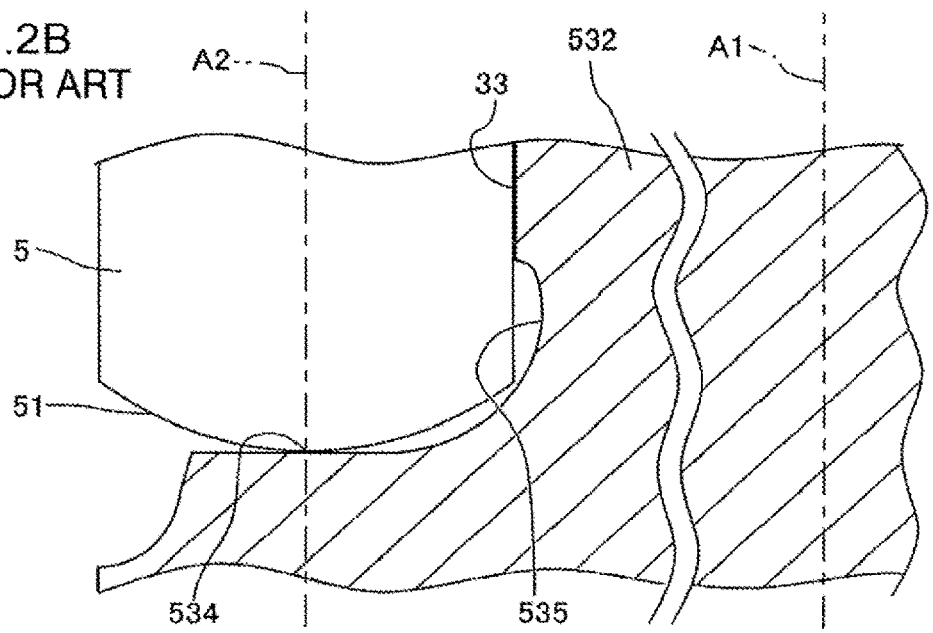
FIG. 2B is a partially enlarged sectional view of a conventional constant velocity joint, provided as a comparison against FIG. 2A.

In a conventional leg shaft 532 shown in FIG. 2B, a contact portion 534 is formed at a position where the contact portion 534 can contact a leading end portion (positioned on the central axis A2) of the end face of the needle bearing 5 facing the first side in the direction of the central axis A2. The recess portion 535 is located on a leading end side (i.e. upper side in FIG. 2B) of the leg shaft 532 with respect to the contact portion 534, and is recessed inward in the radial direction of the leg shaft 532. In this case, if the curvature radius of the recess portion 535 is decreased, the stress concentrates on a portion where the recess portion 535 is formed, deteriorating the strength of the leg shaft 532. On the other hand, if the curvature radius of the recess portion 535 is increased, the axial length of the roll portion 33 is decreased. This reduces the contact area between the roll portion 33 and the needle bearing 5, deteriorating the torque transmission efficiency between the outer joint member 2 and the inner joint member 3.

The recess portion 35 of the present embodiment includes the first concave portion 37 extending inward in the radial direction from the contact portion 34. The first concave portion 37 is formed at a position where the first concave portion 37 is recessed from the end face of the needle bearing 5 facing the first side in the direction of the central axis A2, toward a base side of the leg shaft 32 with respect to the contact portion 34. With this, even in the case where the curvature radius of the recess portion 35 is increased, the connection position between the roll portion 33 and the recess portion 35 can be positioned close to the base side of the leg shaft 32. This can ensure a sufficient axial length of the roll portion 33.

In addition to this, the recess portion 35 is provided with the second concave portion 38 between the first concave portion 37 and the roll portion 33. The second concave portion 38 is formed in a position where the second concave portion 38 is recessed inward in the radial direction of the leg shaft 32 from the outer periphery of the roll portion 33, on which the needle bearings 5 roll. This can make the curvature radius of the recess portion 35 larger than that of the recess portion 535 formed in the conventional leg shaft 532.

Furthermore, the contact portion 34 contacts the end face of the needle bearing 5 facing the first side in the direction of the central axis A2 of the needle bearing 5, at the position distant from the central axis A1 of the leg shaft 32 than the central axis A2 of the needle bearing 5. With this, the recess portion 35 can be formed larger in the radial direction of the leg shaft 32, compared with the conventional leg shaft 532 that contacts the leading end portion (positioned on the central axis A2) of the end face of the needle bearing 5 facing the first side in the direction of the central axis A2 of the needle bearing 5. Therefore, the curvature radius of the recess portion 35 can be made larger.

The normal N of the contact portion 34 is inclined with respect to the central axis A1 of the leg shaft 32, and crosses the central axis A1 of the leg shaft 32 on the leading end side of the leg shaft 32 with respect to the contact portion 34. In this case, the recess portion 35 can be made larger in the radial direction of the leg shaft 32, compared with the case where the conventional leg shaft 532 contacts the end face of the needle bearing 5 facing the first side in the direction of the central axis A2 of the needle bearing 5, at a position where the normal is parallel to the central axis A1 of the leg shaft 532. Therefore, the curvature radius of the recess portion 35 can be made larger.

Moreover, the needle bearings 5 is provided, at the end face facing the first side in the direction of the central axis A2, with the reduced diameter portion 51 that the contact portion 34 can contact. This can prevent early damage of contact portions of the contact portion 34 and the needle bearing 5. In addition to this, since the reduced diameter portion 51 is formed like a surface of a sphere, the contact area between the reduced diameter portion 51 and the contact portion 34 can be reduced. As a result of this, the friction between the needle bearing 5 and the contact portion 34 can be reduced, and the torque can be efficiently transmitted between the outer joint member 2 and the inner joint member 3.

As can be seen, the constant velocity joint 1 can increase the curvature radius of the recess portion 35, while ensuring a sufficient axial length of the roll portion 33. Therefore, the constant velocity joint 1 can efficiently transmit torque, while reducing the deterioration of the strength of the constant velocity joint 1.

The present invention has been described on the basis of the above-described embodiments, but may be modified in various modes without departing the spirit of the present invention.

For example, although the recess portion 35 has the first concave portion 37 and the second concave portion 38 in the above-described embodiments, the recess portion 35 may only have the first concave portion 37. In this case, since the second concave portion 38 is not formed, the connection position between the roll portion and the recess portion can be positioned closer to the base side of the leg shaft 32.

Hereinafter, advantageous effects of the above-described embodiments will be described. As described above, the constant velocity joint 1 includes the outer joint member 2 that is open on a first side thereof in the axial direction, and that has the raceway groove 21 extending in the axial direction; the inner joint member 3 having the leg shaft 32 extending in the radial direction; the roller 4 that is able to roll on the raceway groove 21 of the outer joint member 2; and the needle bearing 5 that supports the inner periphery of the roller 4 such that the inner periphery of the roller 4 is able to rotate with respect to the leg shaft 32 of the inner joint member 3. In addition to this, the leg shaft 32 includes the roll portion 33 that supports the needle bearing 5 such that the needle bearing 5 is able to roll on the roll portion 33; the contact portion 34 that is located on an outside in the radial direction of the leg shaft 32 with respect to the roll portion 33, and that is able to contact an end face of the needle bearing 5 facing the first side in the direction of the central axis A2 of the needle bearing 5; and the recess portion 35 formed between the roll portion 33 and the contact portion 34, in a position where the recess portion 35 is recessed from a space in which the needle bearing 5 is disposed. The recess portion 35 includes the first concave portion 37 formed in a position where the first concave portion 37 is recessed toward the base side of the leg shaft 32 with respect to the contact portion 34.

In this constant velocity joint 1, the recess portion 35 includes the first concave portion 37, which is formed in a position where the first concave portion 37 is recessed toward the base side of the leg shaft 32 with respect to the contact portion 34. In this case, even when the curvature radius of the recess portion 35 is increased, the connection position between the roll portion 33 and the recess portion 35 can be positioned closer to the base side of the leg shaft 32. Thus, a sufficient axial length of the roll portion 33 can be ensured. As a result, the torque can be efficiently transmitted between the outer joint member 2 and the inner joint member 3, while the deterioration of the strength of the leg shaft 32 can be reduced.

In the above-described constant velocity joint 1, the recess portion 35 is provided with the second concave portion 38. The second concave portion 38 is formed between the first concave portion 37 and the roll portion 33, in a position where the second concave portion 38 is recessed inward in the radial direction of the leg shaft 32 with respect to the outer periphery of the roll portion 33, on which the needle bearing 5 rolls. In the constant velocity joint 1, since the curvature radius of the recess portion 35 can be increased, the deterioration of the strength of the leg shaft 32 can be reduced.

In the above-described constant velocity joint 1, the contact portion 34 contacts the end face of the needle bearing 5 facing the first side in the direction of the central axis A2 of the needle bearing 5, at the position distant from the central axis A1 of the leg shaft 32 than the central axis A2 of the needle bearing 5. In the constant velocity joint 1, since the curvature radius of the recess portion 35 can be increased, the deterioration of the strength of the leg shaft 32 can be reduced.

In the above-described constant velocity joint 1, the normal N of the contact portion 34 is inclined with respect to the central axis A1 of the leg shaft 32, and crosses the central axis A1 of the leg shaft 32 on the leading end side of the leg shaft 32 with respect to the contact portion 34. In the constant velocity joint 1, since the curvature radius of the recess portion 35 can be increased, the deterioration of the strength of the leg shaft 32 can be reduced.

In the above-described constant velocity joint 1, the end face of the needle bearing 5 that contacts the contact portion 34 and faces the first side in the direction of the central axis A2 of the needle bearing 5 is provided with the reduced diameter portion 51 whose diameter is reduced toward a leading end side of the reduced diameter portion 51. The contact portion 34 contacts the reduced diameter portion 51 at the position distant from the central axis A1 of the leg shaft 32 than the central axis A2 of the needle bearing 5. In the constant velocity joint 1, since the curvature radius of the recess portion 35 can be increased, the deterioration of the strength of the leg shaft 32 can be reduced.

In the above-described constant velocity joint 1, the reduced diameter portion 51 is formed like a surface of a sphere. In the constant velocity joint 1, the contact area between the reduced diameter portion 51 and the contact portion 34 can be reduced. With this, since the friction between the needle bearing 5 and the contact portion 34 can be reduced, the torque can be efficiently transmitted between the outer joint member 2 and the inner joint member 3.

The invention claimed is:

1. A constant velocity joint comprising:
    an outer joint member that is open on a first side thereof in an axial direction, and that has a raceway groove extending in the axial direction;
    an inner joint member having a leg shaft extending in a radial direction thereof;
    a roller that is able to roll on the raceway groove of the outer joint member; and
    a needle bearing that supports an inner periphery of the roller such that the inner periphery of the roller is able to rotate with respect to the leg shaft of the inner joint member,
    the leg shaft including:
        a roll portion that supports the needle bearing such that the needle bearing is able to roll on the roll portion;
        a contact portion that is located outward in the radial direction of the leg shaft with respect to the roll portion, which contact portion is able to contact an end face of the needle bearing in a direction of a central axis of the needle bearing, the end face facing the first side of the outer joint member; and
        a recess portion formed between the roll portion and the contact portion, the recess portion being recessed from a space in which the needle bearing is disposed, and
    the recess portion including a first concave portion recessed toward a base side of the leg shaft with respect to the contact portion.

2. The constant velocity joint according to claim 1, wherein
    the recess portion further includes a second concave portion formed between the first concave portion and the roll portion, the second concave portion being recessed inward in the radial direction of the leg shall with respect to an outer periphery of the roll portion on which the needle bearing rolls.

3. The constant velocity joint according to claim 1, wherein
    the contact portion contacts the end face of the needle bearing at a position more distant from the central axis of the leg shaft than the central axis of the needle bearing.

4. The constant velocity joint according to claim 3, wherein
    a normal of the contact portion is inclined with respect to the central axis of the leg shaft and crosses the central axis of the leg shaft on a leading end side of the leg shaft with respect to the contact portion.

5. The constant velocity joint according to claim 3, wherein
    the end face of the needle bearing that contacts the contact portion is provided with a reduced diameter portion whose diameter is reduced toward a leading end side of the reduced diameter portion; and
    the contact portion contacts the reduced diameter portion at the position more distant from the central axis of the leg shaft than the central axis of the needle bearing.

6. The constant velocity joint according to claim 5, wherein the reduced diameter portion is formed like a surface of a sphere.

* * * * *